Sept. 27, 1960 R. E. McCAULEY 2,954,145
BEVERAGE MAKING MACHINE
Filed March 8, 1955 2 Sheets-Sheet 2
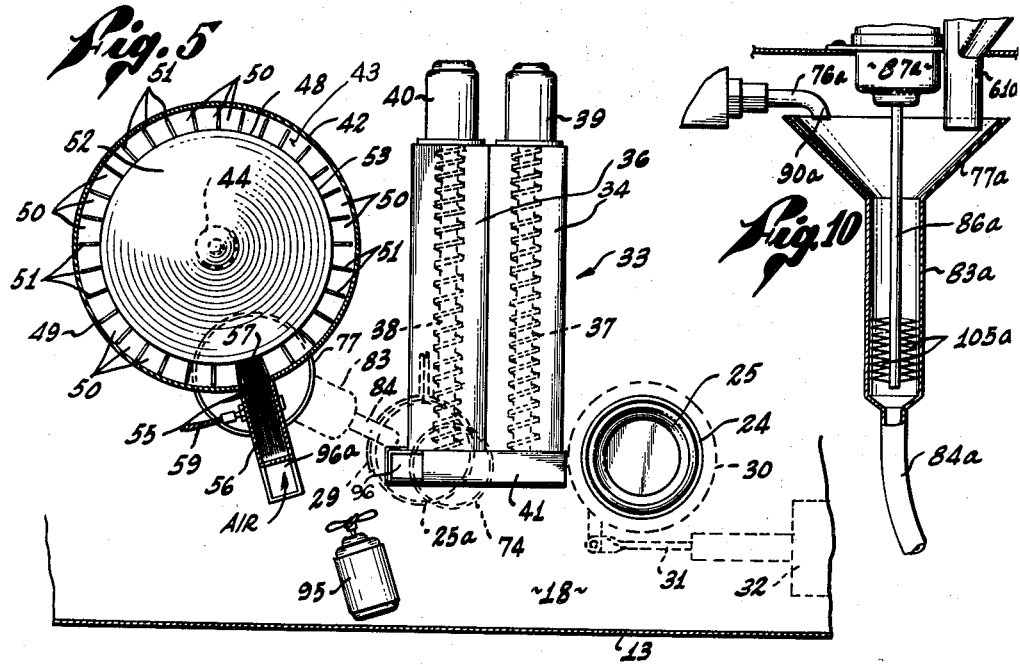
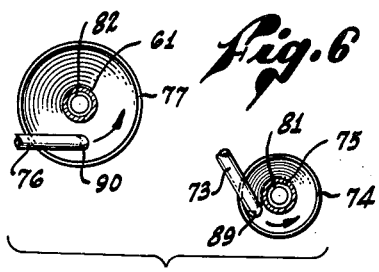
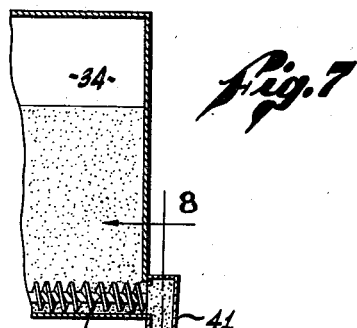
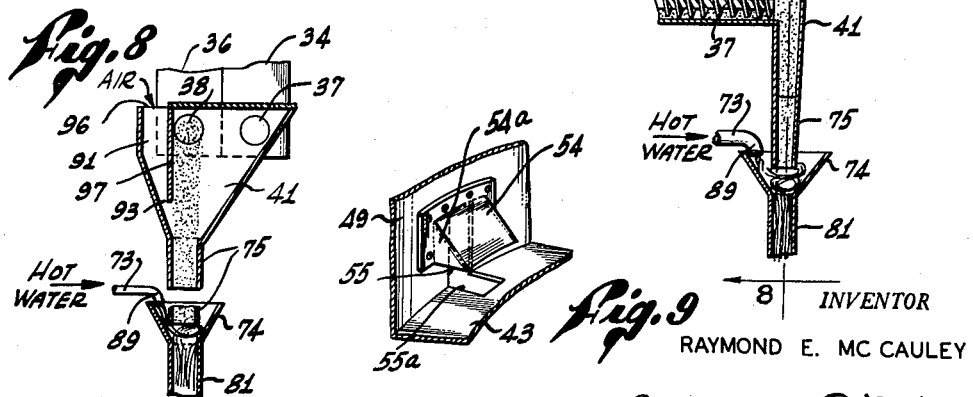
INVENTOR
RAYMOND E. MC CAULEY
BY George R Bliss
ATTY.

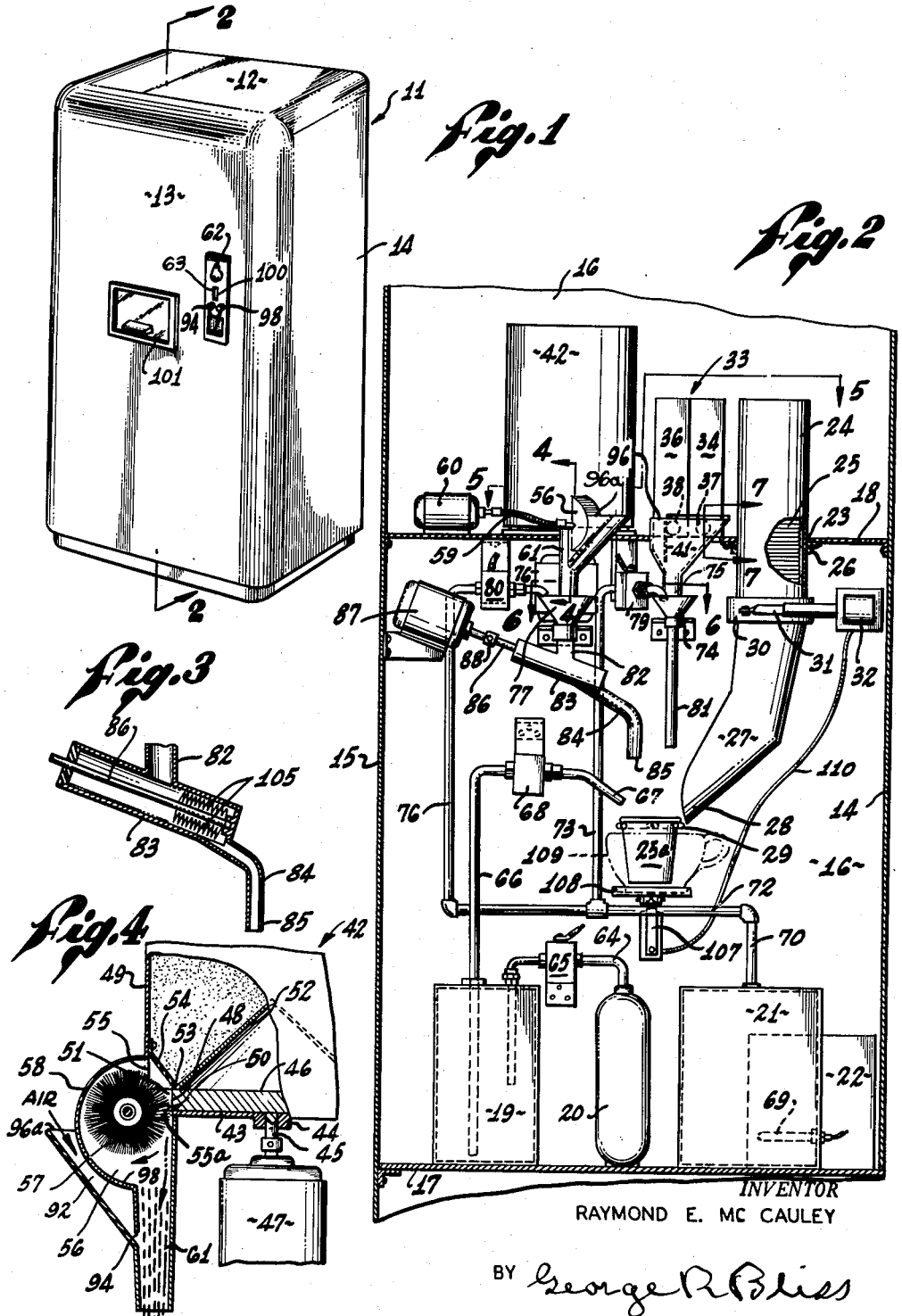

United States Patent Office 2,954,145
Patented Sept. 27, 1960

2,954,145

BEVERAGE MAKING MACHINE

Raymond E. McCauley, 6820 S. Central Ave., Los Angeles, Calif.

Filed Mar. 8, 1955, Ser. No. 492,874

10 Claims. (Cl. 222—129.4)

This invention relates to a dispensing machine for beverages, liquid and semi-liquid foods and the like of the type in which dry solids in powdered or other finely divided form are mixed with a liquid, usually water, and usually a hot liquid, to produce a cup of beverage while the customer waits for it. Specifically, the invention relates to improvements in liquid and semi-liquid dispensing machines, including coin operated machines, which upon activation by a customer may automatically position a cup or other vessel, measure and mix the ingredients, including the powdered solids and hot or cold water or other liquid, and discharge the finished drink, soup, or the like into the cup, which the customer then removes from the machine for consumption of its contents.

The machine described herein, and shown in the annexed drawing, is designed for the making of hot coffee beverage, or a hot chocolate or cocoa beverage, at the option of the customer, who sets the machine for the drink of his choice, prior to depositing the required coin in the coin receiving slot of the machine. If his choice is coffee, the particular machine herein described will make a cup of hot coffee, without cream or sugar, with cream or with sugar, or with both, at the option of the customer, who sets the machine, by manipulating certain levers, buttons and other devices, to cause the machine to produce the type of beverage of his selection.

While this specific machine shown is of the general type above described, some features of the invention are desirable for incorporation in a machine which makes hot coffee only, hot chocolate only, or cold beverages manufactured on the spot by the mixture of powdered dry solids and a liquid such as water or milk.

It is one object of the invention to provide an accurate and positive measuring device applicable to the handling of large portions of powdered solid material, each of which is relatively large in volume proportionate to the final volume of that of the portion of the corresponding finished beverage as is the case with the powdered mix used in making instant chocolate. It is another object of the invention to provide means for preventing the clogging of such powdered materials in their passage from the container or magazine holding the supply, through the various passages to the final mixing bowl where water is added to these dry materials.

Another object is to provide for the thorough mixing and incorporation of the solid matters and especially chocolate mix material in water, or other liquid to provide a smooth suspension or solution of uniform density and homogeneous composition and to provide for this mixing, by a simple small device of a sturdy high speed type, properly located for best results with respect to the other process devices.

It is another object to provide for the introduction of an air stream into the dry powdered material in advance of the mixing of this material with the hot or cold water or other liquid; and it is another object of the invention to so introduce such an air stream concurrently into the stream of powdered material, that the force propelling the flow of the materials will be increased and that the powdered material will be aerated and will be free from a reverse flow of water or liquid vapor, or moisture-laden air, in the direction of the source of supply of the powdered dry material. This reverse flow of moist air, when permitted to occur, tends to cake the powdered material in lumps or upon the sides of the passageways, both clogging the passageways and interfering with the rapid mixing which occurs when the powdered material is uniformly sized and dry and flows at an even rate into the mixing chamber with the hot water.

While certain inventive features contribute to the realization of the above stated, and also certain other objects of the invention, it is recognized that the beverage making machine art is well established and that certain general characteristics of these machines are prevalent and well known to those familiar with such machines. The machine shown in the drawings, and described herein, is provided with a conventional electrical control such as is quite common in this industry, and such that the various steps in the procedure of making a cup of the beverage occur in a predetermined sequence under the automatic control of this control box, after the customer has indicated which one of several beverages he wishes the machine to make, by proper manipulation of the switches, buttons, and the like on the face of the machine.

Since these time control boxes are standard in this and other related industries, they will not be described herein in detail; no circuits will be shown; and only the results of the operation of the control box will be outlined as anyone skilled in the art may readily design control mechanisms which will effect the stated purpose.

Figure 1 is a perspective view of a beverage-making machine which embodies the invention.

Figure 2 is a vertical sectional view of the machine shown in Figure 1, taken along a plane and in the direction indicated by the lines and arrows, 2—2.

Figure 3 is an enlarged vertical sectional view of the mixer for the chocolate beverage.

Figure 4 is a vertical sectional view taken along the line 4—4 of Figure. 2.

Figure 5 is a top plan view taken along the line 5—5 of Figure 2.

Figure 6 is a fragmentary horizontal sectional view taken along the line 6—6 of Figure 2, showing only the chocolate beverage mixing bowl, and the coffee beverage mixing bowl, and associated parts.

Figure 7 is a vertical sectional view taken along the line 7—7 of Figure 2.

Figure 8 is a vertical sectional view taken along the line 8—8 of Figure 7.

Figure 9 is a perspective view showing details of the chocolate metering device.

Figure 10 is an elevational view partly in section of a modified form of the mixer shown in Figures 2 and 3.

The machine is housed within the cabinet or casing 11, which has a top 12, a front wall 13, a right side wall 14, a left side wall 15 (see Figure 2) and a rear wall 16 (see Figures 1 and 2). The bottom edges of the front, side and rear walls of the housing 11, are suitably shaped to rest upon a stand (not shown) and nests thereon for the prevention of lateral displacement.

The housing 11 acts to protect the parts of the machine from foreign matter and from damage, and also serves to support the parts of the machine within its interior chamber. For this latter purpose there are provided an upper platform 18 and a lower platform 17, suitably secured in horizontal position to the walls of the housing 11. The walls of the housing also support directly several of the smaller parts of the machine as will appear later.

Upon platform 17 are mounted a fluid tight tank 19, designed to hold a liquid coffee concentrate, a gas tank 20 to hold nitrogen gas under pressure, a water tank 21, and an electrical control box 22. The upper platform 18 has therein a circular aperture 23, in which is disposed a cylindrically formed magazine 24 holding a supply of nesting cups 25. The magazine 24 is securely attached to the platform 18 by means of an angle iron ring, 26, the flanges of which are fastened to the platform and magazine wall.

The lower chute portion 27 of the magazine 24 is slanted inwardly of the magazine chamber so as to position its lower discharge end 28 adjacent a ring 29 for the placement of each cup 25a as it descends through the chute 27 with the upper rim flange of the cup resting upon the ring 29. The ring 29 may be supported upon the front wall 13 of the housing in any suitable manner (not disclosed in the drawing):

The release of the cups one by one, is accomplished in the manner customarily employed in beverage dispensing machines of this character by means of a cup supporting and releasing ring 30, a reciprocating lever rod 31, and a solenoid 32, which is controlled from the control box 22 through electrical connections not shown.

Also mounted on the upper platform 18 is a magazine 33 having two compartments, 34 and 36. Compartment 34 is intended for the containment of a quantity of powdered cream, and compartment 36 is intended to hold a supply of granulated sugar. A pair of horizontal helical feed screws, 37 and 38, disposed in the bottom of these two compartments, 34 and 36 respectively, when actuated by their respective driving motors, 39 and 40, move measured portions of the powdered cream and granulated sugar into a hopper 41. The motors 39 and 40 are driven for predetermined time intervals by electrical connections (not shown) which lead to the control box 22.

Another magazine 42, cylindrical in shape, is also mounted on the upper platform 18 in the position shown in the drawing. It is intended for holding a supply of powdered chocolate making mix, so processed that when hot water is added to it, a potable beverager is produced. The bottom circular wall 43 of this cylindrical magazine 42 is formed with a hub 44 which acts as a vertical bearing for a vertical stub-shaft 45, projecting downwardly through the bearing from a circular rotataole relatively thick heavy plate 46, to which the stub-shaft 45 is integrally, or otherwise, secured. A motor 47 controlled by connections (not shown) leading to the control box, is employed to rotate the plate 46 intermittently for time intervals of fixed duration, one arcuate movement for each cup of chocolate.

The diameter of the outer rim 48 of this plate is somewhat less than that of the cylinder 42. The annular space between the rim 48 of plate 46 and the adjacent lower portion 49 of the cylindrical side wall of the magazine 42, is divided into a plurality, and preferably a relatively large number of preferably six-sided pocket-like compartments 50, by a series of radial divider plates 51, which extend outwardly from the horizontal plate 46. They may be vertical fins integrally formed with and extending outwardly from the plate 46. Their outermost vertical edge is closely adjacent to the inner surface of the wall 49 of the cylinder 42 (see Figure 4).

To prevent the formation of a stagnant mass of powdered chocolate at the lower end of the chamber within the cylinder 42, a cone 52 is placed in upright position on the upper face of the plate 46 and secured thereto with the outer rim 53 of the cone 52 adjacent to the outer rim surface 48 of the plate 46. The void under the cone 52 is empty of the chocolate powder.

To feed the chocolate powdered mix in accurately measured amounts, devices are provided for the thorough removal of the mix from a predetermined number (as for example one to five) of the pockets 50 for each operation of the machine to make a cup of chocolate. An apron 54 is riveted to the sidewall 49 of the magazine 42 directly above an open bottomed slot 55 in this sidewall. The opening extends from just below the apron to the lower edge of the sidewall. This apron slants downwardly and inwardly, terminating at its lower edge very close to the rim 53 of the cone 52. A second slot 55a of the width of slot 55 and communicatingly aligned therewith is formed in the bottom wall 43 of magazine 42 which extends inwardly to rim 48 of bottom plate 46. The slots 55 and 55a and the apron over them are about the width of a pocket 50. The apron has side walls 54a at its upstream and downstream edges. A receiving hopper 56 is placed just outside of the opening 55, and proximately below opening 55a.

Several of the pockets 55, as for example 4 or 5 of them, pass over the upper end of the hopper 56 at one operation of the machine to make one cup of the beverage chocolate, depending upon how the machine is designed and adjusted. This method of feeding the powdered chocolate makes it possible to positively and accurately regulate the amount of chocolate for each cup. The tendency of the chocolate to pack, to move at irregular speeds, and to adhere to the walls of the machine, makes it necessary at every stage of the movement of the chocolate powder to cause it to move positively and at a steady speed. The cone 52 and the apron 54 feed the chocolate in a steady stream into the row of pockets 50 passing under the apron. The pocket 50 accurately measures each charge of chocolate powder provided that the pockets are completely emptied into the hopper. To provide for this thorough removal of the chocolate powder from the pockets, a disc-shaped brush 57, is mounted on the side walls of the hopper 56 on a horizontal axis directed perpendicularly to the direction of the axis of the magazine 42 and lying generally in the bottom plane of the magazine 42 and slightly displaced without the outer wall 49 of the magazine 42. This brush 57 is of a width in an axial direction about the same as the width of one of the pockets 50, and is in registry with the slot 55. The diameter of the brush is such that the outer end of the bristles, or other pusher elements, scrape the inner walls of the pocket 50. This construction enables the brush to thoroughly remove the chocolate powder from the chamber of each passing pocket 50. The brush shaft is connected by a flexible shaft 59 to a motor 60 which is also operated from the control box 22. The brush 57 rotates in the direction of the arrow shown on Figures 6 and 4. It pushes the chocolate powder directly out of the pocket 50 into the hopper 56 and thence into a chute 61 which communicates at its upper end with the chamber 58 of the hopper 56.

The machine herein described is constructed to produce a hot liquid beverage. In the specific embodiment of the invention disclosed in this description and the annexed drawings, the beverage may be either hot coffee, or hot chocolate, at the option of the customer. Provision is, therefore, made for the addition of hot water to the powdered materials. In the case of the hot coffee beverage, the customer may choose coffee with cream and sugar, coffee with cream alone, coffee with sugar alone, or the so called "black" coffee without either cream or sugar. The mechanism and controls by which this is accomplished are well known in the art and will not herein be described in detail. It suffices to say that the control box 22 is set for coffee by turning switch 62 of the panel 63 on the front wall of the housing 11 to the right hand position over the word "Coffee," where upon the machine by a sequence of operations determined in the electrical control box 22, drops a cup 25a into the ring holder 29 and discharges a measured cup of coffee therein. In this operation the motors 39 and 40 remain idle, and a small charge of liquid coffee concentrate is placed in the cup along with a larger measure of hot water, the two equaling in volume that of a standard cup of coffee. The coffee concentrate and the hot water are placed in the cup by means which will now be described.

As stated earlier, the tank 19 contains coffee concentrate. It is fluid tight with an inlet pipe 64 connecting it with tank 20 containing the compressed nitrogen gas. Pressure on the concentrate is maintained at a constant value by an electrically controlled pressure regulator 65 interposed in the pipe 64. A pipe 66 leads from the bottom of the tank 19 to a discharge spout 67 with its outlet opening directly over the cup 25$^a$ in the holder ring 29. A valve 68 in the pipe 66 is opened and closed for a predetermined interval of time by the electrical control box 22 to discharge the proper amount of liquid coffee concentrate for a cup of coffee.

The tank 21 is filled with water through a conduit (not shown) from a water supply. The water in the tank is heated by a calrod 69 regulated to maintain the water at a constant high temperature. Propelled by the pressure in the water supply conduit, the hot water from the tank 21 moves through a pipe 70 upwardly through pipes 72 and 73 to a mixing bowl 74 which receives either the granulated sugar or the powdered cream, or both, from the hopper 41 through the discharge chute 75. Water also proceeds through pipes 72 and 76 to a mixing bowl 77 which receives powdered chocolate mix from hopper 56 through the vertical chute 61. The volume of water entering the bowl 74, for the preparation of a cup of coffee, and the volume of water entering the bowl 77 for the preparation of a cup of chocolate is regulated by the opening and closing of valves 79 and 80 respectively as controlled by the electrical control box 22.

In the preparation of either a cup of coffee or a cup of chocolate, powdered material drops through chutes 75 or 61 as the case may be, except in the case of the preparation of a cup of black coffee. In that event, hot water enters the bowl 74 from the pipe 73 and falls through a discharge pipe 81 into the cup 25 and at the same time a charge of coffee liquid concentrate enters the cup from the spout 67. But when a cup of coffee with either cream or sugar, or both, is desired, powdered material enters the hopper 41 and falls through the chute 75 into the mixing bowl 74. If dehydrated coffee powder is used instead of liquid coffee concentrate, a third magazine in addition to magazines 34 and 36 would discharge this coffee powder concentrate into the hopper 41.

When a cup of chocolate is being made, the chocolate powder, which may be any of the well-known prepared chocolate mixes incorporating sweetening, milk products, and perhaps flavoring material, falls into the mixing bowl 77 through the chute 61 and is there mixed with the hot water and falls through a short pipe 82 into a beater cylinder 83. This beater cylinder is shown in detail in Figure 3. The pipe 82 is preferably connected into the cylinder 83 intermediate its ends, and the cylinder is inclined at a small angle to the horizontal. However, this cylinder may be inclined at other angles or may even be vertically disposed. A discharge pipe 84 leads from the lower end of the mixing cylinder 83 and is bent to have its spout 85 directly over the cup 25$^a$ for the discharge of the measured quantity of liquid chocolate beverage thereinto.

The mixing cylinder 83 is provided with an axial shaft 86 which is driven at a very high speed by the motor 87 mounted upon the left side wall of the housing, the motor shaft being connected to the shaft 86 by a universal joint 88. The shaft 86 has secured thereto at its lower end portion, two rows of beater blades 105 arranged in diametrically opposite positions from each other. The blades are arranged as shown in Figure 3, to direct materials flowing through cylinder 83 transversely to their direction of flow. The shaft 86 is driven by the motor 87 at a very high speed for an interval of time sufficient to thoroughly mix the solid and liquid ingredients of the chocolate beverage, while they are in motion in their passage through the cylinder 83. The motor 87 is thus actuated for each operation of the chocolate making devices by the electrical control box 22.

In Figure 10 there is illustrated a cylinder 83$^a$ and adjacent parts of the machine, similar to the cylinder 83 described above, but disposed with its axis vertical as mentioned in the course of the above description of the cylinder 83. It is concentrically attached to the mixing bowl 77$^a$ at its upper end and to the discharge pipe 84$^a$ at its lower end, this discharge pipe leading to the place of discharge of the liquid chocolate, wherever that place is, depending upon the construction of the machine. The connecting pipe 82 is eliminated.

The hot water discharge pipe 76$^a$ and spout 90$^a$ are located similarly to the discharge pipe 76 and spout 90 of Figure 6. The chute 61$^a$ corresponding to chute 61 of Figures 2 and 6, however, has its lower discharge end disposed eccentrically of the mixing bowl 77$^a$, instead of concentrically as is the case with the chute 61. The motor 87$^a$ is mounted in vertical position on framework which is in turn supported by the side walls of the machine casing. This motor drives at high speed the shaft 86$^a$ which extends concentrically down into the cylinder 83$^a$. The two diametrically opposite rows of transversely-directing beater blades 105$^a$ are carried by the lower end portion of the shaft 86$^a$, which, as shown in the construction of the drawing, has no bearing support at its lower end. The blades are arranged as shown in Figure 3, to direct materials flowing through cylinder 83 transversely to their direction of flow.

It will be noted that for the better mixing of the ingredients with the hot water, the hot water discharge outlets 89 and 90 (see Figures 6, 7, and 8) are arranged to jet their streams against the inner conical surfaces of the mixing bowls 74 and 77 respectively, near the upper rims of the bowls, and at such an angle as to effect a whirling circular motion of the vortex type within the mixing bowl. Thus the solid ingredients are more thoroughly commingled with the hot water as it enters the mixing bowl.

This vortex action within the mixing bowls tends to create an upwardly moving stream of vapor through the discharge chutes 75 and 61 when this vapor forms from the liquids as they impinge upon the bowls. Presence of this vapor in the chutes may cause a caking deposit of the solids on the walls of the chutes. This effect may reach up into the hoppers 41 and 56, and may even render it necessary to shut down the machine and give it a cleaning. For this reason, the hoppers 41 and 56 are provided with air chambers 91 and 92 respectively, constructed with a common wall 97 in the case of the coffee-making devices and 98 in the case of the chocolate-making devices, between the hopper chamber and the air chamber. These chambers have air inlets 96 and 96$a$ respectively, which open into the general interior chamber of the housing, and air outlets 93 and 94 respectively through which, in each case, a definite stream of air passes while a cup of beverage is being prepared. There are two causative factors bringing about passage of these air streams through the openings 93 and 94. The movement of powdered materials from the hopper down through the vertical chutes 75 and 61 there below, develops a venturi type flow of air through these openings. Supplementing this causative factor, a motor driven air fan 95 (see Figure 5) is mounted to blow an air current at an angle across the openings 96 and 96$a$ (see Figures 2, 5 and 8) of these air chambers, providing a light pneumatic pressure upon the air chambers 91 and 92 and thereby increasing the pressure differential between these air chambers and the chutes 75 and 61, and hopper chambers 41 and 56. The downwardly directed stream of air through the openings 93 and 94 fills under a slight pressure, and pre-empts the interstices in the material passing down chutes 61 and 75, both above and below the junction of these chutes with the openings 93 and 94. The entrance of water vapor from the mixing bowls 74 and 77 into the interstices of the mix as the mix moves down the chutes 61 and 75 is thus precluded, and no water vapor can go into these chutes, and into the hoppers 41 and 56.

These air jets 93 and 94, in addition to preventing any upward retrograde movement of moisture into the passages and chambers containing dry powder, also have the effect of keeping the dry materials moving downwardly both because of the lightening effect of the commingled air, and also by reason of the force exerted upon the dry ingredients by the pressure of the air currents.

The panel 63 on the front face of the housing is equipped with a button 98 which, when pushed in, causes the control box to operate motor 39 for the powdered cream feed, and with a left hand button 94 which causes the control box 22 to actuate motor 40 to operate the granulated sugar feed. These two buttons can only be operated when the switch point 62 is turned to the right over the "Coffee" mark. When it is desired to buy a cup of chocolate the switch 62 is turned to the left over the word "Chocolate." Since these machines are usually coin operated, a coin deposit slot 100 is indicated on the panel. An opening 101 for the hand is also provided on the front wall of the housing, with a glass door which may be opened for reaching into the machine and removing the cup 25 after it has been filled with a hot beverage.

If it is desired to draw a measured portion of the product of the machine into a cup or other container of other than paper material such as might be used by persons having their own cups or containers of metal, chinaware, or other material of greater specific gravity than paper, there is provided in accordance with this invention a spring biased micro switch 107 (see Figure 2) which is actuated upon depression of the cup support 108 against the action of the spring when such a heavier cup or container 109 is placed upon it. This microswitch by closing the electric circuit in a two way conductor 110, actuates a relay (not shown) to open the circuit of the solenoid 32 which prevents the solenoid being energized by the control devices of the control box 22 to operate the rod 31 and ring 32 to release a paper cup into the chute 27.

The volume of dry powdered solids in their dry fluff condition which are used to make a cup of hot chocolate in a machine of this type, or for making a cup of hot chocolate at a soda fountain or in the home, will approximate 50 to 60% of the volume of the cup of liquid chocolate after it is made. The items of this machine which measure the chocolate mix powder, which convey it from one stage to the other, and which mix it with a relatively small volume of hot water have been designed to handle proportionately large volumes of powdered solids. Among such features are the compartments or pockets 50, the devices at the bottom of the chocolate powder magazine, the brush 57, the air stream inlet 94 and the mixer 83.

It will be noted that chocolate or cocoa beverage as well as certain other similar beverages and liquid foods, are characterized in the finished product by a composition of ingredients in physical and chemical association, which is quite different from that of many beverages and liquid foods. While this composition is too complex to thoroughly analyze herein, it is enough for the purpose of presenting the advantages of this invention to mention that the basic chemically homogeneous liquid ingredient is water and that this water is a carrier for a complex assortment of solids which exist in the beverage, some solids in a state of suspension and some solids in a state of solution. Probably also some new liquid substances are formed by chemical union of some of the solids with the water or with each other in the water solution. Some emulsification of fats in this mix probably takes place.

The resulting beverage should be of a smooth consistency of the same composition throughout, and the solids should be evenly distributed in the same proportion both in all portions of a single cupful or other measured single dispensed amount, and in all successive dispensed amounts. It should be free from lumps or uneven concentrations of solids and free from variation in the proportion of liquids, and solutions if more than one liquid or solution is fed to the machine or is formed in processing the beverage. In other words the finished beverage should be homogeneous, both physically and chemically, in every minute particle or portion of the beverage drawn from the machine. Assuming that the chocolate mix of solids placed in the magazine 42 has a fairly uniformly homogeneous character except possibly for some lumpiness of the mixed solids or except for some unduly large particles of one or more kinds of the solids in the mixture, a machine constructed in accordance with the present invention will evenly suspend and dissolve the particles of the mix in the water, will correct lumpiness and uneven distribution of the different kinds of solids, will more finely comminute the solids, will emulsify some of the solid ingredients with the water, and will to a small and desirable extent aerate the beverage. And the resulting beverage will be homogeneous both physically and chemically down to extremely minute quantities thereof, as respects the water and every one of the solid ingredients, whether those ingredients are in a state of suspension, solution, emulsion, or chemical union with the water or some other ingredient. The net result is a creamy beverage of uniformly excellent full flavor and uniformly agreeable consistency.

The homogeneity of the beverage and these resultant advantages are accomplished in this machine by the continuously uniformly metered feed of the mix into the bowl 77 or 77ª, the accurate metering of the charges of water tangentially fed into the bowl, the preliminary commingling of the water and solids in the bowl, the venturi tube injection of air into the stream of the mix en route to the mixing bowl, the short lengths of conduit between the different processing items along the travel path of the ingredients, and the location of a small-diametered mixing cylinder 83, 83ª in a conduit of the travel path, rather than in a tank or large compartment, and preferably in a rapid flow, preferably vertical section of this conduit, and finally the location of the high-speed beater 105, 105ª in the conduit to cover the entire cross sectional area of the travel path in the cylinder and intercept and act upon every particle of the stream of material, while the material is rapidly moving down through the cylinder 83, or 83a.

I claim:

1. In a beverage-making machine, the combination of: a supply of comminuted solid material; a conduit; means for feeding the material in a stream into the conduit; means for introducing a liquid into the stream; and means for introducing a stream of relatively dry air into the stream of comminuted material in the conduit at a point between the location of the feeding means and the location of the means for introducing the liquid, whereby the relatively dry air fills the interstices in the material and thereby prevents a retrograde movement of any other fluid substance through the material.

2. The subject matter defined in claim 1, in which: the flow control of the air introducing means is arranged to cause the direction of flow of the airstream to form an acute angle with the direction of flow of the material in the conduit at their junction, the opening of the angle being directed upstream with respect to both flows.

3. The combination defined in claim 2, in which the said angle is less than substantially 30 degrees.

4. The combination defined in claim 2 and in addition thereto: means for applying a pneumatic pressure to the outer end of said air stream.

5. The combination defined in claim 2 in which the airstream flows to the material stream in a conduit and the said means for applying pneumatic pressure is a revolving air fan mounted to blow a current of air transversely of the outer end of said conduit.

6. In a beverage machine, the combination of, a magazine adapted to contain a mixture of finely divided solid material; a source of liquid in said machine; an inlet chamber formed in said machine in communication with said magazine; metering means in said machine for transferring a predetermined quantity of said solid material from said magazine to the confines of said inlet chamber; liquid dispensing means in said machine for transferring a predetermined quantity of liquid, from said source of liquid, in the form of a curtain extending around and close to the inside of the wall of said inlet chamber; a beater chamber in said machine below said inlet chamber; means communicating said inlet chamber with said beater chamber to permit said solid material and said liquid to pass by gravity from said inlet chamber into and through said beater chamber; a driving means in said machine; a high speed rotary beater operatively connected to said driving means and disposed within said beater chamber, said beater having blade means arranged to rotate transverse to the direction of flow of said solid material and said liquid whereby said solid material and said liquid will be intimately admixed by said beater upon passing through said beater chamber, with negligible effect upon the rate of free flow of said mixture; and discharge means communicating with said beater chamber to receive the admixed solid and liquid mixture.

7. In a beverage machine, the combination of, a magazine adapted to contain a mixture of finely divided solid material; a source of liquid in said machine; an inlet chamber formed in said machine in communication with said magazine; metering means in said machine for transferring a predetermined quantity of said solid material form said magazine to the confines of said inlet chamber; liquid dispensing means in said machine for transferring a predetermined quantity of liquid from said source of liquid to said inlet chamber whereby said liquid can come into contact with said solid material within said inlet chamber; a downwardly inclined beater chamber in said machine below said inlet chamber; conduit means connecting said inlet chamber with said beater chamber to permit a mixture of said solid material and said liquid to pass by gravity from said inlet chamber into and through said beater chamber; an electric motor in said machine; a high speed rotary beater coupled to said electric motor and disposed within said beater chamber, said beater having blade means arranged to rotate transverse to the direction of gravitational flow of said solid material and said liquid passing through said beater chamber whereby said solid material and said liquid will be intimately admixed by said beater with negligible effect upon the rate of free fall of said mixture; and discharge means communicating with said beater chamber to receive the admixed solid and liquid mixture.

8. The combination of claim 7 wherein said beater chamber is defined by a downwardly inclined cylinder, and said beater includes a shaft coaxial with said cylinder with said blade means being formed upon said shaft.

9. In a beverage machine, the combination of, a magazine adapted to contain a mixture of finely divided solid material; a source of liquid in said machine; a bowl in said machine below said magazine and in communication therewith; metering means in said machine for transferring a predetermined quantity of said solid material from said magazine to the confines of said bowl; liquid dispensing means in said machine for transferring a predetermined quantity of liquid from said source of liquid to said bowl, said liquid dispensing means having an outlet adjacent one side of said bowl whereby said liquid will flow around said bowl in a circular path; a downwardly inclined beater chamber in said machine below said bowl; conduit means connecting said bowl with said beater chamber to permit a mixture of said solid material and said liquid to pass by gravity from said bowl into and through said beater chamber; an electric motor in said machine; a high speed rotary beater coupled to said electric motor and disposed within said beater chamber, said beater having blade means arranged to rotate transverse to the direction of gravitational flow of the mixture of said solid material and sail liquid passing through said beater chamber whereby said solid material and said liquid will be intimately admixed by said beater with negligible effect upon the rate of free fall of said mixture; and discharge means communicating with said beater chamber to receive the admixed solid and liquid mixture.

10. The combination of claim 9 wherein said beater chamber is defined by a downwardly inclined cylinder, and said beater includes a shaft coaxial with said cylinder with said blade means being formed upon said shaft.

References Cited in the file of this patent

UNITED STATES PATENTS

| | | |
|---|---|---|
| 1,111,960 | Heylman | Sept. 29, 1914 |
| 1,226,108 | Olney | May 15, 1917 |
| 1,865,773 | Madden | July 5, 1932 |
| 2,517,073 | Alvarez | Aug. 1, 1950 |
| 2,569,486 | Mills | Oct. 2, 1951 |
| 2,596,568 | Lehman | May 13, 1952 |
| 2,597,063 | Catanzano | May 20, 1952 |
| 2,712,887 | King | July 12, 1955 |